US011645639B2

(12) United States Patent
Brooks et al.

(10) Patent No.: US 11,645,639 B2
(45) Date of Patent: *May 9, 2023

(54) SYSTEMS AND METHODS OF MANAGING PERPETUAL INVENTORY (71) Applicant: Walmart Apollo, LLC, Bentonville, AR (US)

(72) Inventors: Cristy C. Brooks, Cassville, MO (US); Benjamin D. Enssle, Bella Vista, AR (US); David B. Brightwell, Bella Vista, AR (US); Daniel R. Shields, Lakeville, MN (US); Greg A. Bryan, Centerton, AR (US); Matthew A. Jones, Bentonville, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 56 days.

This patent is subject to a terminal disclaimer.

(21) Appl. No.: 17/349,196

(22) Filed: Jun. 16, 2021

(65) Prior Publication Data

US 2021/0312415 A1    Oct. 7, 2021

Related U.S. Application Data (63) Continuation of application No. 16/438,990, filed on Jun. 12, 2019, now Pat. No. 11,049,086, which is a
(Continued)

(51) Int. Cl.
*G06Q 20/20*  (2012.01)
*G06Q 10/0875*  (2023.01)
*G06N 20/00*  (2019.01)

(52) U.S. Cl.
CPC .......... *G06Q 20/203* (2013.01); *G06N 20/00* (2019.01); *G06Q 10/0875* (2013.01); *G06Q 20/202* (2013.01)

(58) Field of Classification Search
CPC ............. G06Q 20/203; G06Q 10/0875; G06Q 20/202; G06N 20/00
See application file for complete search history.

(56) References Cited

U.S. PATENT DOCUMENTS 5,963,919 A    10/1999  Brinkley
7,222,786 B2    5/2007  Renz
(Continued)

FOREIGN PATENT DOCUMENTS

EP    1901215    3/2008
WO    2015184286    12/2015
WO    2016109251    7/2016

OTHER PUBLICATIONS

A. G. Kok, K. H. Shang. Inspection and replenishment policies for systems with inventory record inaccuracy. M&SOM, 9 (2) (2007), pp. 185-205. (Year: 2007).
(Continued)

*Primary Examiner* — Nathan A Mitchell
(74) *Attorney, Agent, or Firm* — Fitch, Even, Tabin & Flannery LLP (57) ABSTRACT In some embodiments, systems and methods are provided to monitor and adjust perpetual inventory (PI). Some embodiments comprise multiple point of sale (POS) systems; an inventory system and a perpetual inventory (PI) engine control circuit that receives inventory information and is configured to identify the occurrence of a plurality of different events each associated with a different product at a shopping facility and corresponding to a potential inconsistency in a determined inventory count; and for each of the events: identify a first set of inventory evaluation rules; apply the first set of inventory evaluation rules to determine a type of inventory count error; determine an inventory adjustment action to be implemented based on the first product and the determined error type; and cause the inven-
(Continued)

tory adjustment action to be implemented in substantially real-time to adjust the determined inventory count of the first product at the first shopping facility.

20 Claims, 5 Drawing Sheets

Related U.S. Application Data continuation of application No. 15/862,406, filed on Jan. 4, 2018, now Pat. No. 10,360,548.

(60) Provisional application No. 62/442,062, filed on Jan. 4, 2017.

(56) References Cited

U.S. PATENT DOCUMENTS

| | | | |
|---|---|---|---|
| 7,552,066 B1 | 6/2009 | Landvater | |
| 8,195,533 B1* | 6/2012 | Mishra | G06Q 10/087 700/109 |
| 8,224,717 B2 | 7/2012 | Giacobbe | |
| 8,321,303 B1 | 11/2012 | Krishnamurthy | |
| 8,346,630 B1* | 1/2013 | McKeown | G06Q 10/087 705/28 |
| 8,965,796 B1* | 2/2015 | Gala | G06Q 20/203 705/28 |
| 10,360,548 B2 | 7/2019 | Brooks | |
| 11,049,086 B2 | 6/2021 | Brooks | |
| 2003/0216969 A1* | 11/2003 | Bauer | G06K 17/00 705/22 |
| 2004/0158507 A1 | 8/2004 | Meek | |
| 2008/0082428 A1* | 4/2008 | Stein | G06Q 10/087 705/28 |
| 2008/0120205 A1* | 5/2008 | Hoopes | G06Q 10/087 705/28 |
| 2008/0243646 A1* | 10/2008 | Stein | G06Q 10/087 705/28 |
| 2008/0270269 A1* | 10/2008 | Myers | G06Q 10/087 705/28 |
| 2009/0101713 A1* | 4/2009 | Ulrich | G06Q 10/087 235/383 |
| 2009/0157533 A1* | 6/2009 | Ohno | G06Q 20/203 705/28 |
| 2011/0055172 A1* | 3/2011 | Tan | G06F 16/24568 707/769 |
| 2011/0153614 A1* | 6/2011 | Solomon | B65G 1/127 707/769 |
| 2012/0209734 A1* | 8/2012 | Brooks | G06Q 20/203 705/16 |
| 2013/0018696 A1* | 1/2013 | Meldrum | G06Q 10/06315 705/348 |
| 2014/0379535 A1* | 12/2014 | Brief | G06Q 10/087 705/28 |
| 2016/0171428 A1* | 6/2016 | Gooijer | G06Q 10/087 705/28 |
| 2016/0371613 A1* | 12/2016 | Ulrich | G06Q 10/087 |
| 2017/0161674 A1* | 6/2017 | Jones | G06Q 10/087 |
| 2017/0200106 A1* | 7/2017 | Jones | G06Q 10/08 |
| 2018/0005174 A1* | 1/2018 | Dixon | G06Q 30/0202 |
| 2018/0189720 A1* | 7/2018 | Henderson | G06Q 10/087 |
| 2018/0189760 A1 | 7/2018 | Brooks | |
| 2018/0247264 A1* | 8/2018 | Taylor | G06Q 10/06316 |
| 2018/0365616 A1* | 12/2018 | Taylor | G06Q 10/087 |
| 2019/0130346 A1* | 5/2019 | Brooks | G06Q 10/087 |

OTHER PUBLICATIONS

McClain, John O; Cornell University; "Simulating Inventory Control with Orders that Cross during Lead Time"; http://www.exinfm.com/excel%20files/Inventory_Simulation.xls; Mar. 22, 2002; pp. 1-60.

N. DeHoratius, A. J. Mersereau, L. Schrage. Retail inventory management when records are inaccurate. Manufacturing and Service Operations Management, 10 (2) (2008), pp. 257-277. (Year: 2008).

PCT; App. No. PCT/US2018/012347; International Search Report and Written Opinion dated Mar. 6, 2018.

SAP; "How to Set Up and Manage a Perpetual Inventory System"; SAP; Jun. 22, 2016; pp. 1-108.

Trujillo, Paul; "Walmart is Addressing Inventory Problems With a New System"; http://www.waspbarcode.com/buzz/walmart-2/; Nov. 15, 2016; pp. 1-7.

U.S. Appl. No. 15/862,406; Notice of Allowance dated Mar. 22, 2019.

U.S. Appl. No. 15/862,406; Office Action dated Aug. 6, 2018.

U.S. Appl. No. 15/862,406; Office Action dated Dec. 6, 2018.

U.S. Appl. No. 16/438,990; Notice of Allowance dated Feb. 24, 2021.

U.S. Appl. No. 16/438,990; Office Action dated Nov. 2, 2020.

* cited by examiner

FIG. 8 ial Application No. 62/442,062, filed Jan. 4, 2017, each
SYSTEMS AND METHODS OF MANAGING PERPETUAL INVENTORY

CROSS-REFERENCE TO RELATED APPLICATION

This application is a continuation of U.S. patent application Ser. No. 16/438,990, filed Jun. 12, 2019, which is a continuation of U.S. patent application Ser. No. 15/862,406, filed Jan. 4, 2018, which claims the benefit of U.S. Provisional Application No. 62/442,062, filed Jan. 4, 2017, each of which is incorporated herein by reference in its entirety.

TECHNICAL FIELD

This invention relates generally to an inventory system.

BACKGROUND

In a retail environment, it is typically important to track inventory. Often errors in tracking inventory occur, which can affect the supply chain. Further, incorrect inventory information can adversely affect the availability of products at a shopping facility. Accordingly, there is a need to improve inventory management.

BRIEF DESCRIPTION OF THE DRAWINGS

Disclosed herein are embodiments of systems, apparatuses and methods to improve perpetual inventory management. This description includes drawings, wherein.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

The following description is not to be taken in a limiting sense, but is made merely for the purpose of describing the general principles of exemplary embodiments. Reference throughout this specification to "one embodiment," "an embodiment," "some embodiments", "an implementation", "some implementations", "some applications", or similar language means that a particular feature, structure, or characteristic described in connection with the embodiment is included in at least one embodiment of the present invention. Thus, appearances of the phrases "in one embodiment," "in an embodiment," "in some embodiments", "in some implementations", and similar language throughout this specification may, but do not necessarily, all refer to the same embodiment.

Generally speaking, pursuant to various embodiments, systems, apparatuses and methods are provided herein useful to track and/or improve perpetual inventory management. Some embodiments provide a perpetual inventory (PI) control system that includes multiple point of sale (POS) systems, one or more inventory systems, and one or more perpetual inventory (PI) engines. Typically, several POS systems are positioned at each of multiple different shopping facilities. Each inventory system is communicatively coupled with a set of the multiple POS systems, and in some instances, an inventory system may communicatively couple with POS systems of multiple shopping facilities. The perpetual inventory (PI) engine communicatively couples with at least one inventory system, and typically multiple inventory systems.

The PI engine receives inventory information from inventory systems and typically further receives sales data recorded by the POS systems. In some implementations, the PI engine is configured to identify the occurrence of a plurality of different events. Each event is associated with one or more different products of thousands of different products at one or more of the different shopping facilities. Further, each event corresponds to a potential inconsistency in a determined inventory count of the corresponding product. For each of the events, the PI engine is configured to identify a set of inventory evaluation rules from multiple sets of inventory evaluation rules that depend on the event and the corresponding product. The first set of inventory evaluation rules are applied to determine a type of inventory count error relative to the determined inventory count of the product at one or more shopping facilities. An inventory adjustment action can be determined that is to be implemented based on the product and the determined error type. The PI engine can cause the inventory adjustment action to be implemented in substantially real-time to adjust the determined inventory count of the first product at the first shopping facility. The shopping facilities may, in some instances, be a retail sales facility, a fulfillment center (which may be associated with one or more retail stores, one or more on-line shopping services, or the like), a distribution center, or other type of facility. Some shopping facilities position numerous products throughout a sales floor that are to be sold and/or distributed to customers. The facility may be any size or format, and may include products from one or more merchants. For example, a facility may be a single store operated by one merchant, a chain of two or more stores operated by one entity, or may be a collection of stores covering multiple merchants.

Previous systems that attempt to track inventory typically track limited items under restricted conditions. Typically, count information is provided by workers and this is compared with an assumed count. Some systems attempt to adjust inventory based on throw-aways, but these are dependent on workers accurately recording those throw-aways. Further, many previous inventory adjustments required workers to look at numbers and make decisions, which typically introduced significant lag time in evaluation, and further lag time in trying to implement any type of correction. As such, corrections often resulted in duplication of adjustments because prior to instructions being issued to correct an error, store workers see the problem independently account for the error.

Figure 1:
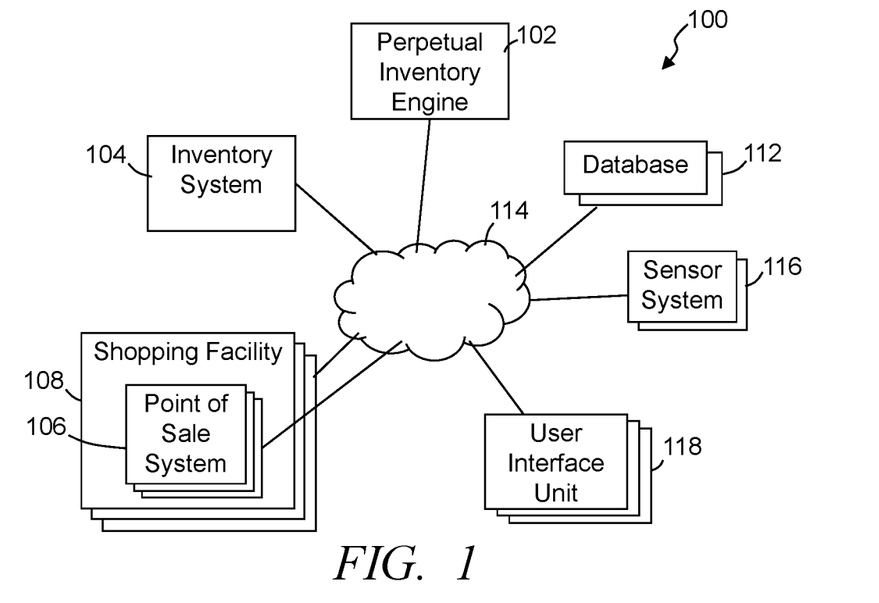
FIG. 1 illustrates a simplified block diagram of an exemplary perpetual inventory (PI) control system, in accordance with some embodiments.

FIG. 1 illustrates a simplified block diagram of an exemplary perpetual inventory (PI) control system 100 in accordance with some embodiments. The PI control system is configured to monitor perpetual inventory quantities or counts of numerous products, often tens of thousands of products or more at one or more shopping facilities, and automatically initiate inventory adjustment activities to manage perpetual inventory of these products, often without human interaction and typically without need for human authorization. For many products, the PI control system operates in real-time receiving data in real-time, applying rules to that information and initiating inventory adjustment actions in substantially real-time in response to detected errors. The errors are typically errors of actual inventory, and generally not errors based on system errors. Many, if not most, of the errors are not registered errors. That is, the errors are not entered by a user into the system. Instead, the PI system detects potential issues and based on the application of one or more rules detects errors and determines whether and what actions are to be taken based on the error, the product and other factors.

The PI control system 100 includes one or more perpetual inventory (PI) engine systems 102 communicatively coupled via a distributed computer and/or communication network 114 with one or more inventory systems 104 each associated with one or more retail shopping facilities 108, distribution centers, fulfillment centers and/or other retail product sales or distribution facilities. Each retail shopping facility and/or other sales systems (e.g., on-line sales systems) includes multiple point of sale (POS) systems 106 configured to enable customers to purchase products at the respective shopping facilities. In some instances, one or more POS systems may be customer operated while others are facility worker operated. Typically, the one or more inventory systems are communicatively coupled with at least a set of the multiple POS systems at one or more shopping facilities and configured to receive sales information, which can be used by the inventory systems, typically with other inventory data, to track inventory counts of thousands of products and typically hundreds of thousands of products or more at the one or more shopping facilities. Some embodiments employ multiple PI engines distributed over the communication network 114 to enable distributed processing. Further, the multiple PI engines can allow the system to operate at real-time to evaluate inventory at thousands of shopping facilities or more. In some embodiments, the PI engines may further include and/or communicatively couple with buffering and/or memory that operate to continuously update and duplicate data across multiple locations allowing rapid access to duplicative data, as well as providing backups to the data. For example, in some embodiments the one or more PI engines may utilize the data distribution systems and processes described in U.S. Application No. 62/150,755, filed Apr. 21, 2015, which is incorporated herein by reference in its entirety.

The PI control system 100 typically further includes one or more databases 112 that can be accessed by one or more of the systems of the PI control system. For example, the databases may include one or more inventory databases storing information regarding inventory counts, inventory history data, product orders, and/or other such inventory information; one or more rules databases that maintain multiple inventory evaluation rules, rules parameters, historic information associated with inventory evaluation rules, and the like; one or more inventory adjustment action databases that, in some embodiments, maintains actions to be taken relative to one or more products based on evaluations of inventory information relative to one or more rules; customer databases maintaining customer information of customers of the shopping facilities 108; and other such databases.

Further, the PI control system may include and/or be in communication with multiple worker and/or customers' user interface units 118 (e.g., shopping facility specific electronic scanner devices, smart phones, tablets, computers, laptops, and/or other such devices). Further, sensor systems 116 and/or one or more user interface units 118 are typically utilized and/or installed at shopping facilities, distribution centers, fulfillment centers, and other locations. Such sensor systems may communicate detected sensor data to the inventory system, PI engine and/or other systems. The sensor systems may include, for example, bar code sensors, radio-frequency identifier (RFID) tag readers, image capture and processing systems, and/or other such sensor systems.

Figure 2:
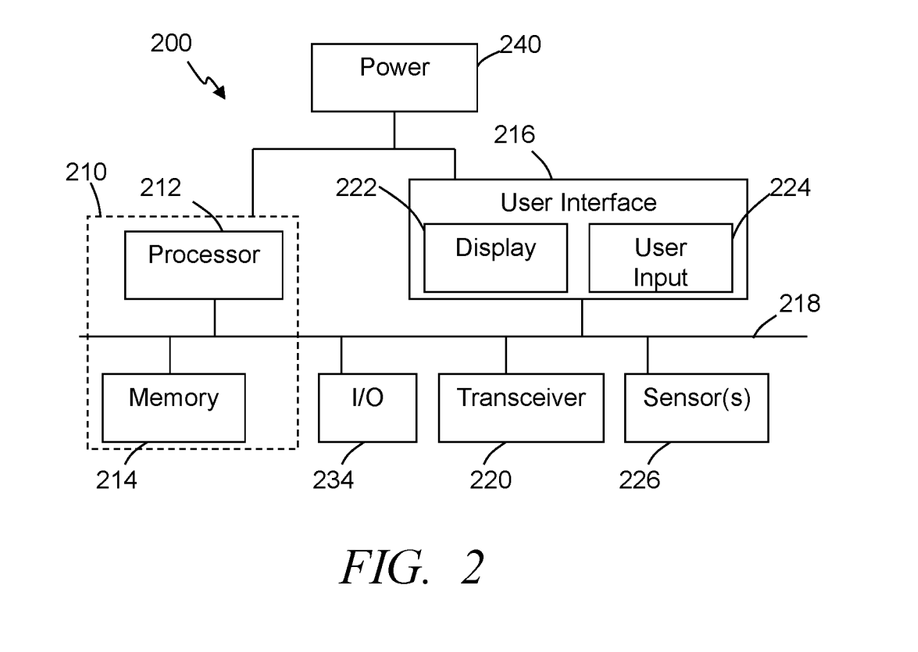
FIG. 2 illustrates an exemplary system for use in implementing methods, techniques, devices, apparatuses, systems, servers, sources and managing inventory, in accordance with some embodiments.

Further, the circuits, circuitry, systems, devices, processes, methods, techniques, functionality, services, servers, sources and the like described herein may be utilized, implemented and/or run on many different types of devices and/or systems. FIG. 2 illustrates an exemplary system 200 that may be used for implementing any of the components, circuits, circuitry, systems, functionality, apparatuses, processes, or devices of the PI control system 100 of FIG. 1, and/or other above or below mentioned systems or devices, or parts of such circuits, circuitry, functionality, systems, apparatuses, processes, or devices. For example, the system 200 may be used to implement some or all of the PI engine 102, the inventory system 104, POS systems 106, user interface units 118, sensor systems 116, and/or other such components, circuitry, functionality and/or devices. However, the use of the system 200 or any portion thereof is certainly not required.

By way of example, the system 200 may comprise a control circuit or processor module 212, memory 214, and one or more communication links, paths, buses or the like 218. Some embodiments may include one or more user interfaces 216, and/or one or more internal and/or external power sources or supplies 240. The control circuit 212 can be implemented through one or more processors, microprocessors, central processing unit, logic, local digital storage, firmware, software, and/or other control hardware and/or software, and may be used to execute or assist in executing the steps of the processes, methods, functionality and techniques described herein, and control various communications, decisions, programs, content, listings, services, interfaces, logging, reporting, etc. Further, in some embodiments, the control circuit 212 can be part of control circuitry and/or a control system 210, which may be implemented through one or more processors with access to one or more memory 214 that can store instructions, code and the like that is implemented by the control circuit and/or processors to implement intended functionality. In some applications, the control circuit and/or memory may be distributed over a communications network (e.g., LAN, WAN, Internet) providing distributed and/or redundant processing and functionality. Again, the system 200 may be used to implement one or more of the above or below, or parts of, components, circuits, systems, processes and the like. For example, the system may implement the PI engine 102 with the control circuit being a PI engine control circuit, the inventory system 104 with an inventory system control circuit, a sensor system with a sensor system control circuit, or other components.

The user interface 216 can allow a user to interact with the system 200 and receive information through the system. In some instances, the user interface 216 includes a display 222 and/or one or more user inputs 224, such as buttons, touch screen, track ball, keyboard, mouse, etc., which can be part of or wired or wirelessly coupled with the system 200. Typically, the system 200 further includes one or more communication interfaces, ports, transceivers 220 and the like allowing the system 200 to communicate over a communication bus, a distributed computer and/or communication network 114 (e.g., a local area network (LAN), the Internet, wide area network (WAN), etc.), communication link 218, other networks or communication channels with other devices and/or other such communications or combination of two or more of such communication methods. Further the transceiver 220 can be configured for wired, wireless, optical, fiber optical cable, satellite, or other such communication configurations or combinations of two or more of such communications. Some embodiments include one or more input/output (I/O) ports 234 that allow one or more devices to couple with the system 200. The I/O ports can be substantially any relevant port or combinations of ports, such as but not limited to USB, Ethernet, or other such ports. The I/O interface 234 can be configured to allow wired and/or wireless communication coupling to external components. For example, the I/O interface can provide wired communication and/or wireless communication (e.g., Wi-Fi, Bluetooth, cellular, RF, and/or other such wireless communication), and in some instances may include any known wired and/or wireless interfacing device, circuit and/or connecting device, such as but not limited to one or more transmitters, receivers, transceivers, or combination of two or more of such devices.

The system 200 comprises an example of a control and/or processor-based system with the control circuit 212. Again, the control circuit 212 can be implemented through one or more processors, controllers, central processing units, logic, software and the like. Further, in some implementations the control circuit 212 may provide multiprocessor functionality.

The memory 214, which can be accessed by the control circuit 212, typically includes one or more processor readable and/or computer readable media accessed by at least the control circuit 212, and can include volatile and/or nonvolatile media, such as RAM, ROM, EEPROM, flash memory and/or other memory technology. Further, the memory 214 is shown as internal to the control system 210; however, the memory 214 can be internal, external or a combination of internal and external memory. Similarly, some or all of the memory 214 can be internal, external or a combination of internal and external memory of the control circuit 212. The external memory can be substantially any relevant memory such as, but not limited to, solid-state storage devices or drives, hard drive, one or more of universal serial bus (USB) stick or drive, flash memory secure digital (SD) card, other memory cards, and other such memory or combinations of two or more of such memory, and some or all of the memory may be distributed at multiple locations over the communication and/or computer network 114. The memory 214 can store code, software, executables, scripts, data, content, lists, programming, programs, log or history data, user information, customer information, product information, and the like. While FIG. 2 illustrates the various components being coupled together via a bus, it is understood that the various components may actually be coupled to the control circuit and/or one or more other components directly. PI errors can originate from multiple different sources. For example, PI errors can result from theft, incorrect shipments, incorrect store worker PI changes, point of sale errors, throw-aways that are incorrectly accounted, misplacements, and other such errors. The PI control system attempts to detect PI errors and direct actions to correct and/or notify personal of such errors.

The PI engine 102, in some embodiments, is configured to monitor and adjust perpetual inventory of products corresponding to one or more shopping facilities. Inventory information is received by the PI engine from the inventory system 104. Typically, the PI engine further accesses and/or receives sales data recorded by the POS systems 106. Using the inventory information, sales information, sensor information, and/or other relevant information, the PI engine is configured to identify the occurrence of a plurality of different inconsistency events or sequence of events each associated with one or more different products of thousands of different products at one or more of the multiple different shopping facilities 108. The inconsistency events and sequence of events, in at least some instances, correspond to a potential inconsistency in previously determined inventory counts of the corresponding products associated with the inconsistency event. As described above, the determined inventory counts may be provided to the PI engine based on workers counting items of one or more products, scans of a product identifier (e.g., bar code, RFID tag, etc.) and/or a shelve identifier along with an indication of an empty shelf or shelf having a low product count, counts based on POS information, inputs regarding throw-aways, inputs based on theft, system applied assumptions (e.g., anticipated quantity of theft of a particular product over a period of time, anticipated inaccuracies at a POS system, etc.), received product shipments, customer orders and/or deliveries, and other such inputs to determine and/or receive product inventory counts and/or to adjust inventory counts. In some instances, the events of a sequence of events are limited to events occurring within a sequence threshold time period.

Such events can be any one of numerous different events that indicate a potential inconsistency and/or can be used to detect potential inconsistencies in inventory counts of products. For example, events can include but are not limited to a threshold number of empty scans by one or more workers indicating a product shelf location, where items of a product are intended to be presented to customers for purchase at a shopping facility, is empty or is lower than a threshold number; receiving a notice of a count of items of a product by a worker that is inconsistent with a stored inventory count of that product; a worker is directed to stock a shelf with items of a product and returns products because the shelf was fuller than inventory count indicated; receiving a notification of a sale of an item of a product that had a count of zero prior to the sale; detecting a threshold drop in sales activity; detecting no sales when inventory count is at a static count; receiving a count or notice of excess product indicating an understated PI; identifying a threshold reduction in sales rates of a product; detecting a lack of a sale of a product for a threshold period of time; and other such events.

The PI engine 102 is configured to identify, for each of the events, a set of inventory evaluation rules from multiple different sets of inventory evaluation rules to be used in evaluating PI relative to at least one corresponding product. The identification of the set of inventory evaluation rules is dependent on the event and a corresponding product that may have PI inconsistencies. The sets of rules each include one or more rules to be applied to inventory information and/or PI inventory counts corresponding to the product for which the PI is being evaluated in determining whether there is a potential and/or actual PI error and/or to initiate correction of an error relative to that product at one or more locations within one or more shopping facilities. The identified set of inventory evaluation rules are applied by the PI engine to, at least in part, determine whether there is an inventory error and/or determine a type of inventory count error relative to the determined inventory count of the product at the relevant shopping facility. Types of PI inventory errors can include, for example but are not limited to, overstated perpetual inventory (OPI), understated perpetual inventory (UPI), negative perpetual inventory (NPI), insufficient data sets, inconsistent received information, and other such error types. Additionally or alternatively, in some embodiments, the PI engine may apply one or more sets of one or more rules based on a scheduling in addition to one or more detected inconsistencies, errors and/or other such events. The timing can be defined for such scheduling relative to rules, which may allow a worker to change the timing through a scheduler of the PI engine. For example, rules may be run on calendar events, predefined time periods, time of year, and other such scheduling.

When an error is detected, the PI engine can determine, based at least in part on the product and/or the determined error type, an inventory adjustment action to be implemented. The adjustment action can cause adjustments to inventory counts, cause one or more workers to take one or more actions, initiate further evaluations, issue one or more notifications, and/or other relevant actions. For example, an inventory adjustment action may cause instructions to be communicated to a worker to perform a manual count of one or more products at one or more locations at a shopping facility. Further, in some embodiments with at least some inventory adjustment actions, the PI engine can be configured to cause the inventory adjustment action to be implemented in substantially real-time to adjust the determined inventory count of one or more products at the relevant shopping facility. For example, product purchase information may be provided to the PI engine and/or an inventory system 104, which can be immediately used to identify when a negative PI is present, and the PI engine can immediately initiate an inventory adjustment action based on the detected negative PI. Other real time applications of one or more rules can be applied and inventory adjustment actions initiated to quickly address errors and/or potential errors.

As another example, the PI engine may receive notification that a shipment of a first product was received at a shopping facility that was specified to include a count of 12 items of the first product. An error may be detected when the inventory count is less than the 12 or less than a threshold variation from the 12 count. For example, if an inventory count for the first product indicated a count of nine after the received delivery that was supposed to include the 12 items, and there is no other data indicating there should be a difference from the 12 count (e.g., sales, throw-aways, etc.), the PI engine may apply a set of one or more rules to determine whether the inventory count is within a supplier error rate (e.g., rate of 10% inaccurate deliveries). When the error indicates an inaccuracy, the PI engine based on one or more rules may cause an adjustment of inventory to the 12 count of the shipment, or depending on one or more factors may set the count to 10 in an effort to compensate for a supplier error rate and a margin of error. Other products may adjust the count from nine to 11 because less margin of error may be desired based on one or more rules (e.g., rules associated with products that sell at a slower rate, and PI engine anticipates receiving subsequent data points that can be used to confirm and/or make subsequent adjustments).

In some instances, one or more sets of rules may include multiple rules that can be run in series, in parallel, or a combination of series and parallel (e.g., two rules run in parallel with a subsequent third rule applied in series to the results from one or both of the two rules run in parallel). The rules can correspond to one or more thresholds, the detection of a condition, one or more previous adjustment actions, and other such factors. In some embodiments, for example, the set of rules may include one or more decision trees, comparisons with historic data, comparisons with thresholds, algorithms, instructions, instructions to perform one or more actions and evaluations of effects from the one or more actions, and other such rules. For example, a decision tree may include the application of a first rule and when a condition is not met a second rule may be applied, and when a condition is not met a third rule may be applied. The decision tree may apply substantially any number of rules of a set of rules associated with the decision tree and the product being considered. In those instances where a condition is met, one or more actions may be directed by the rule and/or a subsequent rule. Still further, a decision tree may direct the application of two or more rules in parallel. In some embodiments, the PI engine identifies one or more rules that may apply to a particular product and/or during a particular consideration.

Further, some embodiments prioritize rules and/or rules may have a priority within a set such that one rule is applied over another rule in an order that rules are applied relative to a particular error condition, product and/or other such factors. In some applications, hundreds or more priority engines, which can be implemented by one or more PI engines 102, apply one or more sets of one or more rules. Factors are associated with each set of rules and each rule in determining whether and when to apply a rule. Some embodiments prioritize rules and/or rules may have a priority within a set such that one rule is applied over another rule, and/or defines a sequence of the application of a set of rules and/or rules within a set. Further the priority can define when rule and/or results of a rule are utilized over another rule and/or results of another rule when there is a conflict and/or collision. For example, results from the application of a first rule may be considered over the results of a second rule when there is a conflict between results. In some embodiments, the PI engine can define a confidence level or value to a particular rule and/or set of rules relative to different products. The results of utilizing a rule or set of rules relative to one or more different products and the correction action taken can be tracked over time and used to define priorities. Over time the confidence value can be used in prioritizing rules and/or sets of rule. Further, priorities may vary depending on one or more conditions, such as time of year, time of day, time of week, when a last delivery of a product was received, etc. The PI engine may direct the application of one or more rules or set of rules over one or more other rules or set of rules based on the confidence value and/or priority. Further, rules may be applied in a sequence based on their priority. In some embodiments, the PI engine in applying a set of inventory evaluation rules identifies a priority of each of the inventory evaluation rules of the set as a function of the event, and applies one or more of the set of inventory evaluation rules in accordance with the priorities of the set of inventory evaluation rules. Priority levels may be defined with one or more rules associated with each level.

In many instances, the PI engine applies the same rule or set of rules relative to multiple different products and/or in different situations. Often, however, the PI engine utilizes different variables and/or thresholds when applying the same rule or set of rules relative to different products and/or different situations. This may depend on a rate of sale of a product, rate of theft of a product, rate of identified inventory error, and/or other such factors. For example, a first rule may apply that detects an overstated PI when a product identifier of a particular product and/or shelf identifier is received, indicating an empty shelf corresponding to the particular product, a threshold number of times while the PI count of that product (and in some instances at that shelf location) indicates a count of some quantity (e.g., greater than zero). The threshold number of times may vary depending on the product being considered, the time being considered, the retail shopping facility being considered, other such factors, or combination of two or more of such factors. In some instances, for example, a first product can be associated with an empty shelf scan threshold count of three zero scans, an empty shelf scan threshold count of two can be associated a second product, and an empty shelf scan threshold count of four can be associated with a third product (e.g., third product sells at a faster rate than the second product, and thus a "picking" or restocking may not have occurred quickly enough). Additionally or alternatively, a threshold may be set by a worker of a shopping facility. In some embodiments, the PI engine may adjust a threshold and/or parameter over time based on feedback and/or evaluating inventory counts and/or PI errors in response to an inventory adjustment action.

Similarly, as another example, the PI engine may in some embodiments identify an event corresponding to a first product and determine that the first product has inventory inaccuracies consistent with and/or within a threshold variation of a second product. Based on the consistencies between first and second products and/or inventory errors associated with these products, the PI engine may select a set of inventory evaluation rules that were previously applied relative to the second product, and apply the set of inventory evaluation rules relative to the first product. In at least some instances, however, the PI engine while applying the inventory evaluation rules may apply one or more different parameters based on the set of inventory evaluation rules being applied relative to the first product instead of the second product to identify an inventory adjustment action to be implemented based on the first product relative to a shopping facility.

Further, an event can be a scheduled event. PI evaluations of one or more products can be scheduled to occur. The scheduling can be based on a product or type of product, based on a one or rules, based on expected events, based on attempts to prevent events, or the like. In some embodiments, a worker can define the schedule with one or more rule engines operating based on calendar events. Additionally, an event may be based on a result from the application of another rule. Accordingly, rules often are dependent on other rules. Through the PI monitoring by the PI engine, shopping facility workers and management systems can be relieved of monitoring PI because the PI engine automatically monitors and initiates adjustment actions in attempts to bound inventory counts within threshold margins. Further, the PI engine can operate in real-time to enable quicker responses, potentially preventing or at least limiting adverse effects do at least to inventory inaccuracies.

Figure 3:
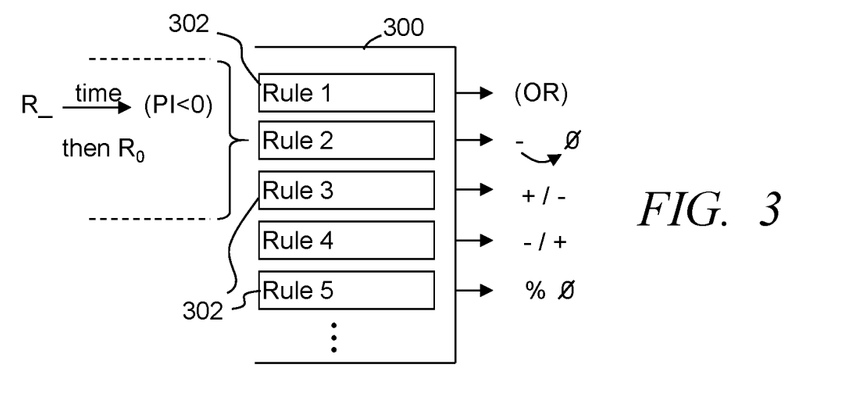
FIGS. 3-5 illustrate simplified block diagram representations of exemplary priority engines each implemented by one or more PI engines in applying one or more of a set of rules.
Figure 4:
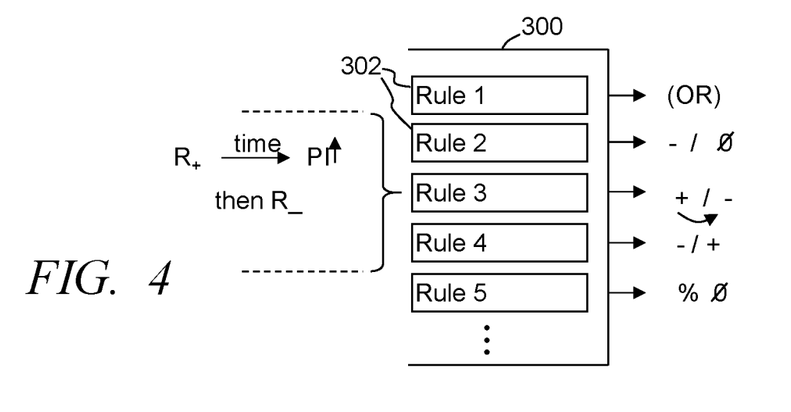
Figure 5:
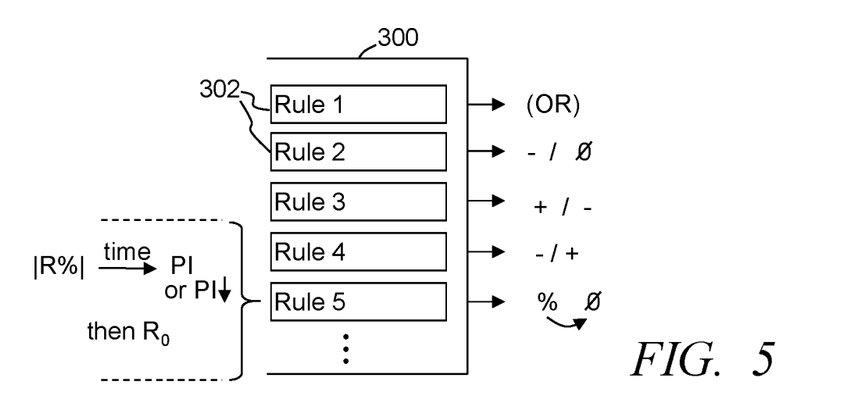

FIGS. 3-5 illustrate simplified block diagram representations of exemplary priority engines 300 each implemented by one or more PI engines 102 in applying one or more of a set of rules 302. The priority engine prioritizes the rules and/or sets of rules, and the PI engine directs the application of one or more sets of rules based on the product being considered, the potential errors, previously applied rule sets, and/or other factors. In the example of FIG. 3, the PI engine identifies that PI of a first product that is over stated and based on a first rule ("$R_-$") reduces the PI count for a first product. Over time, the PI engine subsequently identifies that the PI count has dropped below zero (PI<0). The set of rules then applies a zero rule (Ro) zeroing the PI count or increasing the PI count to a predefined non-zero value, which would depend on the product, sales rates, error rates, other such factors, or combination of two or more of such factors. In the example of FIG. 4, one or more rules from a set are applied causing an increase in PI count ($R_+$). Overtime, the PI engine determines the PI count is greater than a threshold value that is higher than reasonable or possible. Accordingly, the PI engine applying the one or more rules of the set causes the PI to be reduced ($R_-$). The reduction ($R_-$) is defined by the rule set and can be a fixed number reduction, a reduction based on a function (e.g., (PI*0.03)+ factor). In the example of FIG. 5, one or more rules of a set are applied where the PI count is adjusted based on a percentage, which could be greater than 100% or less than 100% depending on the desired adjustment. Over time, the PI engine through the application of the rule set may identify the PI count is too high (e.g., greater than a threshold), or too low (e.g., less than a threshold) based on previous adjustments, and can in this example zero the PI count.

As introduced above, in some embodiments, the PI engine is configured to apply adjustments over time to fine tune when to and whether to apply rules, adjust thresholds to be associated with rules, and/or other such modifications. Typically, the PI engine is configured to modify one or more inventory evaluation rules, parameters, thresholds, and the like that were previously applied in evaluating the inventory count of one or more products based on results from the PI engine applying a first set of inventory evaluation rules. Further, in some instances, the PI engine may direct one or more inventory adjustment actions to test rules and/or in attempts to clarify potential errors. This testing can further be used to correct and fine tune the rule application and/or determine which rules are to apply in different situations and/or relative to different products. Overtime the PI system can identify correct and incorrect adjustment actions, rules, thresholds and the like based on resulting changes in sales, inventory counts and other such resulting effects following the implementation of inventory adjustment actions and/or lack of implementing inventory adjustment actions. For example, in some instances the PI engine may auto-learning based on changes in sales, such as sales gains in response to an inventory adjustment action to correct an inventory count error. Further, the PI system may be able to identify products having similar characteristics (e.g., similar sales rates, similar types of products, similar inventory quantities, etc.), in evaluating inventory adjustment actions, adjustments and/or to provide auto corrections to the rules, thresholds, parameters and the like. The similarities between products and/or characteristics between products can vary depending on the type of PI error, the potential inventory adjustment action and/or other such factors. In some embodiments, the PI engine can apply analytics, detect trends and/or patterns, statistically evaluate multiple different inventory adjustments relative to resulting changes in sales or other results, in evaluating the application of rules, thresholds, inventory adjustment actions and the like in auto-tuning the rules, thresholds, actions and their application as the system continues to process inventory information.

In many instances, a determined inventory adjustment action to apply may be dependent on a previous rule applied and/or a corresponding inventory adjustment action taken based on the rule. The PI engine, in some embodiments, may select one or more inventory adjustment actions based on a previous inventory adjustment action implemented relative to a previous determined inventory count of a product at a particular shopping facility. For example, the PI engine may apply one or more first rules that identifies an inventory count of a product as being too high, and as a result direct an inventory adjustment action to reduce the inventory count of that product. Subsequently, the PI in applying one or more second rules may identify (e.g., based on sales data of the product) that a PI count of that product has dropped to a negative value ("−PI"). Physical inventory at a retail facility typically cannot drop below zero. Accordingly, the PI engine may determine, based on the application of one or more third rules, that a previous rule specifying an inventory adjustment action reducing an inventory count applied too large of a reduction, and direct subsequent inventory adjustment action to zero out the inventory count or increase the inventory count to a threshold number. The PI engine continue to monitor the inventory count of the product relative to subsequent sales, restocking, delivery and/or other such activities.

As another example, one or more first rules identify inventory count was really high (e.g., above a threshold determined based on associate feedback and/or other data points). one or more second rules may direct the reduction of the inventory count. The quantity of reduction may be a fixed number based on the first and/or second rules, based on the product, or based on other such factors. The reduction, for example, may be based on some algorithm (e.g., (Count*0.6)+$factor_1$−Condition)=reduction), based on a percentage, a fixed number, or the like. The reduction may further attempt to limit too rapid a change, and as such a margin of error may be applied, and subsequent application of the one or more second rules may result in still further reductions, an indication that one or more other rules should be applied, that no subsequent action should be taken, or the like.

Typically, inventory of many products is rapidly changing due to sales, deliveries, incorrect identification, incorrect sales, throw-aways, and other such factors. Accordingly, in some embodiments, the PI engine in applying the one or more sets of inventory evaluation rules and causing one or more inventory adjustment actions to be implemented is not attempting to determine the actual inventory count of a product at a shopping facility (i.e., an exact count of the product at one or more locations within the shopping facility). Instead, the PI engine in applying the one or more sets of rules and causing the inventory adjustment action to be implemented attempts to maintain over time (e.g., during which multiple different ordered shipments of the product are received at the shopping facility and shelves restocked) the actual inventory count of the product at the shopping facility within threshold margins of inventory errors, which are defined by a difference between the actual inventory counts of the product at the shopping facility and the determined inventory counts over time. As such, the PI engine attempts to continuously guide the inventory counts of products by continuously tracking and evaluating inventory counts based on the application of one or more sets of rules, and making adjustments over time as determined based on the applied rules. By guiding the PI count, the PI engine in some applications provides boundaries to inventory count at shopping facilities that fluctuate over time in attempts to limit errors and in some instances limit relatively large swings in inventory count. In some instances, rules are defined to continue to cause adjustments to be initiated until an error in an opposite direction (e.g., from overstated to understated, from understated to overstated, etc.), and then make one or more compensating adjustments in the opposite direction. As such, the system can guide the perpetual inventory count within desired limits. In some applications, the PI engine may further apply one or more margins of error (e.g., error on the side of caution and have too many items of a product rather than too little in attempts to limit or prevent missed sales.

In some embodiments, the PI engine further filters products in determining whether to apply one or more rules and/or whether a product qualifies or is authorized to have perpetual inventory automatically adjusted and/or managed through the PI engine. With respect to some products, workers associated with a shopping facility may designate one or more products as unauthorized to having inventory counts of those product to be automatically adjusted by the PI control system 100. As such, the PI engine can maintain a listing of products relative to one or more shopping facilities that are not authorized to have inventory adjustment activity automatically applied, and can prevent evaluating those products and/or prevents one or more inventory adjustment actions from being applied without prior authorization. Similarly, the PI engine can apply one or more filters to identify whether inventory count evaluations should be performed, whether one or more rules are prevented from being applied to one or more products and/or relative to one or more shopping facilities, whether threshold conditions are met to apply one or more rules and/or to implement one or more adjustment actions. In some embodiments, the PI engine may identify a set of products that each have a predefined relationship with at least of one of a set of filter parameters, and prevents the PI engine from causing one or more inventory adjustment actions to be implemented relative to each of the products of the set of products. Such filtering can be based on sales rates, rates of predicted errors, product pricing, product placement within a shopping facility, type of product, timing (e.g., time of year, time of day, etc.), and/or other such filtering.

For example, filtering may be applied based on how similar products are (e.g., how similar are their sales rates, types of products, locations in a shopping facility, inventory count errors, causes of inventory count errors, etc.). In some applications, when products have one or more thresholds similarities, filtering may allow similar rules to be applied in evaluating inventory count errors and/or implement determined inventory adjustment actions; and when product do not have the one or more threshold similarities, the PI engine may direct one or more workers to implement a physical count or other physical validation at one or more shopping facilities, or may prevent the application of some or all rules and/or some or all inventory adjustment actions. As another example, filtering maybe applied based on lead times to accurately detect an inventory error (e.g., when relatively long or relatively short, the PI engine may apply rules and implement relevant inventory adjustment actions, but when lead time is in-between, the PI engine may not apply one or more rules or implement one or more inventory adjustment actions, or may direct workers to perform a shopping facility validation). Another filtering may include a comparison of inventory count relative to desired on-hand inventory at a shopping facility (e.g., when there is a threshold difference between determined PI and desired on-hand, the PI engine may apply one or more rules and/or implement automated inventory adjustment actions, while requesting shopping facility validation when the difference is less than the threshold). In some instances, a shelf life filter may be applied such that one or more rules may be applied and/or automated inventory adjustment actions may be implemented when a shelf life is less than a threshold, while a shopping facility validation or prevention of automated inventory adjustment actions taken when shelf life of the product is greater than a threshold.

Other filtering may correspond to specific items. For example, filtering may be applied relative to a difficulty to stock a particular item (e.g., when a stocking difficulty level is greater than a threshold the PI engine may evaluate inventory levels and implement adjustment actions, while preventing adjustment actions and/or requesting shopping facility validation when the stocking difficulty level is less than the threshold). Similarly, some filtering may consider difficulty in reserving a location within the shopping facility to present the product; rule error rates; transferability rates; and/or other such factors. Other filters may be shopping facility related (e.g., inventory date; shopping facility statues (e.g., during or scheduled remodel, during or scheduled relocation of product); shopping facility size; shopping facility sales quantity; shopping facility class; shopping facility operation execution rate; shopping facility impact status; etc.).

Figure 6:
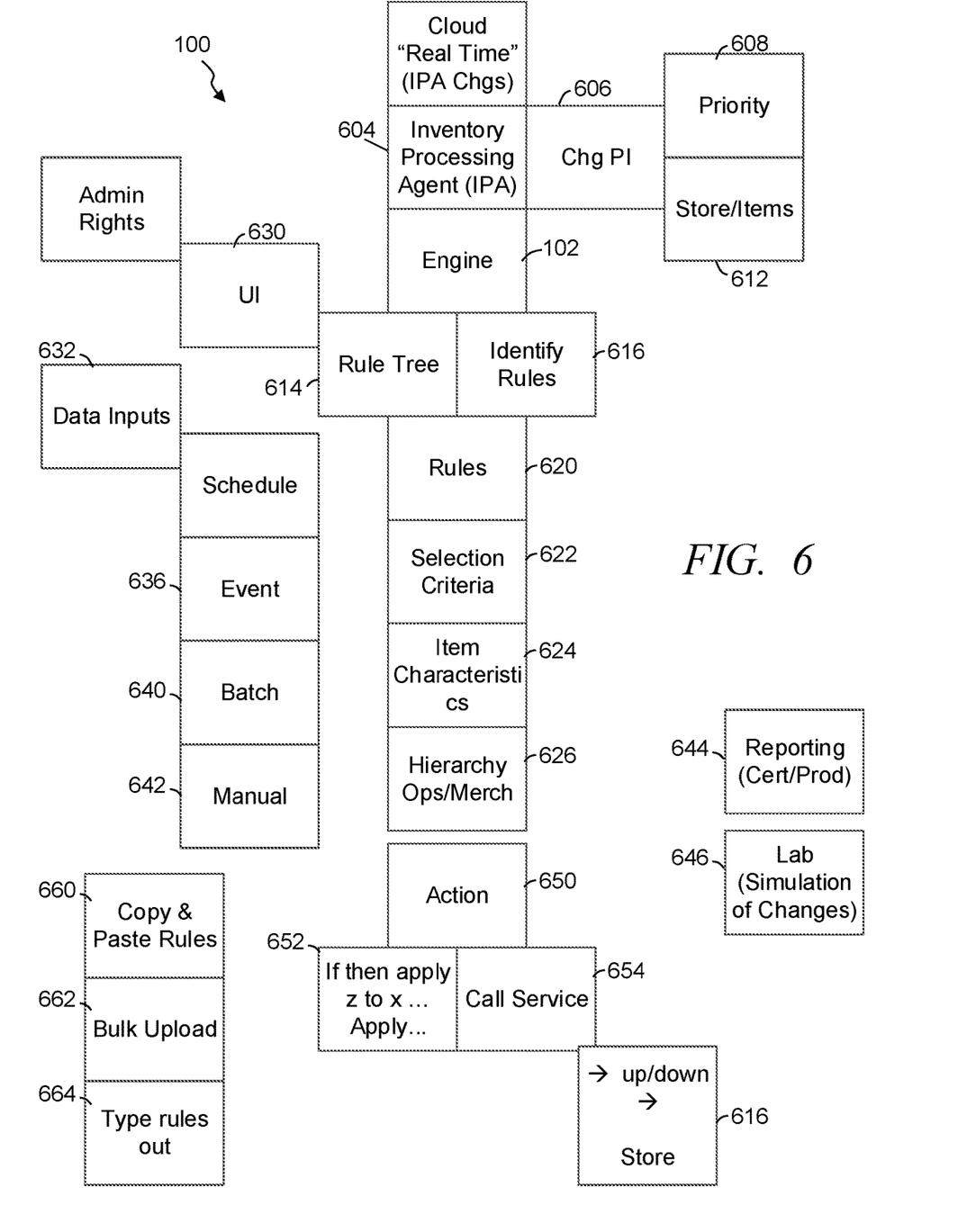
FIG. 6 illustrates a simplified block diagram of an exemplary PI control system, in accordance with some embodiments.

FIG. 6 illustrates a simplified block diagram of exemplary functional components of an exemplary PI control system 100, in accordance with some embodiments. The PI control system is configured to provide real-time product inventory adjustments at one or more retail shopping facilities. In some implementations the PI control system is operated as a distributed system distributed through multiple systems across the distributed computer network 114. In some embodiments, the PI control system includes an inventory processing agent 604 that is configured to identify inventory adjustment actions to implement 606 inventory adjustments at one or more shopping facilities. Prior to directing the changes the PI control system may consider one or more priorities 608 (e.g., rate of sales of products, quantity or level of change, type of error, etc.) and store item combinations 612. The PI control system applies the inventory adjustment actions to change inventory counts up, down, by some percentage, based on one or more algorithms, based on statistical evaluation of one or more factors, etc. The PI control system includes the PI engine 102 that is making the determination of whether or not to implement an inventory adjustment action and by how much. The PI engine utilizes one or more rule trees 614 and considers one or more factors to identify 616 one or more rules to apply and in what order to apply the rules. The rule tree includes and/or accesses multiple different rules 620, and selects the one or more rules to apply in evaluating inventory based on one or more selection criteria 622 (e.g., rule_X is only run on Tuesdays relative to product A), which can be based on a schedule and item characteristics 624, which further may be based on hierarchy 626 through, for example, operations, merchants or the like. Further, at least some of the rules apply operators, calculations, algorithms, sub-rules and/or other functions.

Typically, the PI control system 100 includes a user interface 630 that allows a user to input rules, update rules, modify rules, define characteristics and/or parameters relative to rules and the like. Access to enter and/or modify the rule tree 614 is typically restricted to authorized users. Data 632 is inputted to the PI control system and/or accessed by the PI control system. The data may be inputted through one or more methods, such as but not limited to schedule based 634, event based 636, batched 640, manually 642, etc. Further, at least some of the data is real-time data, which may be schedule and/or event based. Some of the data may be stored in one or more databases 112 accessible by the PI engine 102 via the computer network 114 and/or other sources of data. The PI control system further includes reporting 644 that can maintain data, process data (e.g., statistical processing, compilation, evaluation relative to one or more rules, etc.), and generate one or more reports and other such information for use in modifying and improving the operation of the system, rules, and the like. Some embodiments include simulation processing and/or labs 646 that can, at least in part, evaluate rules and/or potential changes prior to application. Additionally, the PI control system is configured to determine inventory adjustment actions, and cause actions 650 to be implemented through internal actions, the output and communication of instructions, which again may be dependent on one or more rules 652 and/or the association between data, such as causing changes of inventory count by a value or percentage based on one or more calculations, changing inventory count to a specified value, reverting a count, directing an inventory system to adjust an inventory count of one or more products, adjusting orders of products, and the like. Other actions may in part include directing actions 654 at one or more shopping facilities, at distribution centers, at distributors, or other locations, and can include one or more actions to be performed, such as directing workers to perform a count, directing the picking and/or stocking of shelves, etc. Operators that can be applied may be logic based, algorithm based, statistics based, and/or other such operations. In some instances, the system may include functionalities such as, but not limited to copying and pasting rules 660, bulk uploads of rules 662, pattern rules out by type 664, and the like.

As described above, some embodiments enable the monitoring and adjustment of perpetual inventory in real time. This real time monitoring can be implemented, in some embodiments, through the pushing or distributing of inventory information, perpetual inventory information over multiple distributed storage devices and/or making the data accessible to multiple different processing systems. Additionally or alternatively, some embodiments implement push or distribution schemes that do not wait for a request and do not receive a confirmation of transmission. With many network systems, the communication protocol includes one or more steps of initiating a communication connection with a receiving entity or awaiting a request for information, a confirmation that the communication can be transmitted, the transmission of the communication, and a confirmation that the communication was received. Some embodiments, however, bypass many if not all of these types of network communication protocols and distributes the inventory and/or perpetual inventory data without checking for a response to the communication.

Some embodiments continuously evaluation local content and identify changes to inventory and/or perpetual inventory data. These changes are distributed to multiple different distributed database storage systems and/or processing systems that update and maintain a relevant and real time current information mirroring the information at the shopping facilities. This continuously pushes perpetual inventory data out to multiple processing systems to enable the processing systems to have real time access to the perpetual inventory information. As such, the PI control system 100 is able to provide real time perpetual inventory adjustments over hundreds and event thousands of retail facilities.

Figure 7:
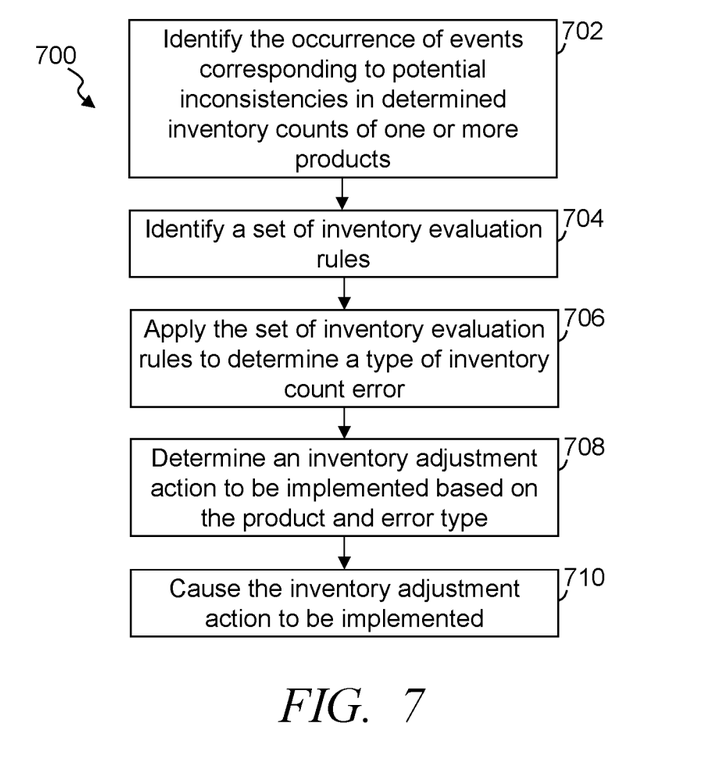
FIG. 7 illustrates a simplified block diagram of a process of monitoring and adjusting perpetual inventory (PI), in accordance with some embodiments.

FIG. 7 illustrates a simplified block diagram of a process 700 of monitoring and adjusting perpetual inventory (PI), in accordance with some embodiments. In step 702, the occurrence of each of a plurality of different events is identified. Each event is typically associated with a different product of thousands of different products at one of multiple different shopping facilities. Further, event may correspond to a potential inconsistency in a determined inventory count of a corresponding first product. In step 704, at least one set of inventory evaluation rules is identified from multiple sets of inventory evaluation rules for at least one event. The identification of the set of rules is typically dependent on the event and the corresponding first product.

In step 706, the set of inventory evaluation rules are applied to determine a type of inventory count error relative to the determined inventory count of the first product at the shopping facility. In step 708, an inventory adjustment action is determined that is to be implemented based on the first product and the determined error type. In step 710, the PI engine 102 causes the inventory adjustment action to be implemented in substantially real-time to adjust the determined inventory count of the first product at the shopping facility. The process or one or more steps of the process can be repeated for each event, whether detected, scheduled, manually activated, etc.

In some embodiments, the application of one or more sets of inventory evaluation rules can include identifying a priority of each of the inventory evaluation rules of the set of inventory evaluation rules as a function of the event. At least one of the set of inventory evaluation rules can be applied in accordance with the priorities of the set of inventory evaluation rules. Some embodiments further identify one or more additional events, of the plurality of events, corresponding to a second product. The PI engine can determine the second product has inventory inaccuracies consistent with the first product, and can select the set of inventory evaluation rules. The set of inventory evaluation rules can be applied while applying at least one different parameter based on the set of inventory evaluation rules being applied relative to the second product, and identify a second inventory adjustment action to be implemented based on the second product relative to a second shopping facility.

Some embodiments, in determining the inventory adjustment action, select the inventory adjustment action based on a previous inventory adjustment action implemented relative to a previously determined inventory count of the first product at the first shopping facility. Typically, the PI engine in causing one or more inventory adjustment actions to be implemented attempts to maintain over time, during which multiple different ordered shipments of the first product are received at the shopping facility, actual inventory counts of the first product at the first shopping facility within threshold margins of inventory errors defined by a difference between the actual inventory count of the first product at the first shopping facility and the determined inventory counts. Further, the PI engine in applying the set of inventory evaluation rules and the causing the inventory adjustment action to be implemented typically does not attempting to determine the actual inventory count of the first product at the first shopping facility. Instead, the PI engine attempts to limit inventory count errors, and in some instances, attempts to bound inventory count within threshold margins of error. As such, the PI engine attempts to limit large swings in inventory. Further, in attempts to continue to adapt to changing conditions and factors, one or more inventory evaluation rules of one or more sets of inventory rules that may have previously been applied in evaluating the inventory count of the product may be modified based on results from applying the one or more sets of inventory evaluation rules. In some embodiments, a set of one or more products may be identified that each have a predefined relationship with at least of one of a set of filter parameters. The PI engine can prevent one or more inventory adjustment actions to be implemented relative to each of the products of the set of products, and in some instances, prevents evaluation of the PI for one or more of the set of products.

Some embodiments access various data sources, such as but not limited to rate of sale by stock keeping unit (SKU), sales patterns, calendar information, item price, shipment dates, store Pl change amounts, store Pl change dates, book inventory, shelf availability scans, global supplier out of stocks, Economic order quantity (EOQ) quantities, lead and review times, other data sources, and often combinations of two or more of such data can be utilized in one or more rules and/or a rule building tool. Within the rules building tool, which may be part of or in communication with the PI engine, various rules (algorithms, decision trees, etc.) can be built. The output of one or more rules or combination of rules may include changes to data within the PI engine, one or more databases 112, inventory system 104, etc. The changes may include, for example, store and/or item level PI. In some embodiments, the PI engine is further configured to output reporting and analytics on the changes made and error detection. Multiple rules can be applied to the same SKUs or data. The PI engine can further establish a hierarchy within the system for the rules. In some embodiments, the PI engine is configured to test for suspected Pl errors, and other data change needs, by making changes and/or taking actions (e.g., pushing a case of product to a shopping facility and monitoring the sales results before taking other actions). In some embodiments, the PI engine can test and monitor the results of new rules and new rule hierarchy's through the ability to run rules through simulation modes. Further, the PI engine can make changes over time to self-tune the rules, parameters applied, actions initiated, and/or other such conditions by storing and monitoring changes and results over time. The PI engine can apply many PI correction algorithms, which may already be known or may be developed and/or adjusted over time relative to sales, deliveries, and PI patterns. The PI engine enables continuous creation, testing, monitoring, and refining of new rules, sets of rules, the hierarchies between rules, and the like through a single system.

Figure 8:
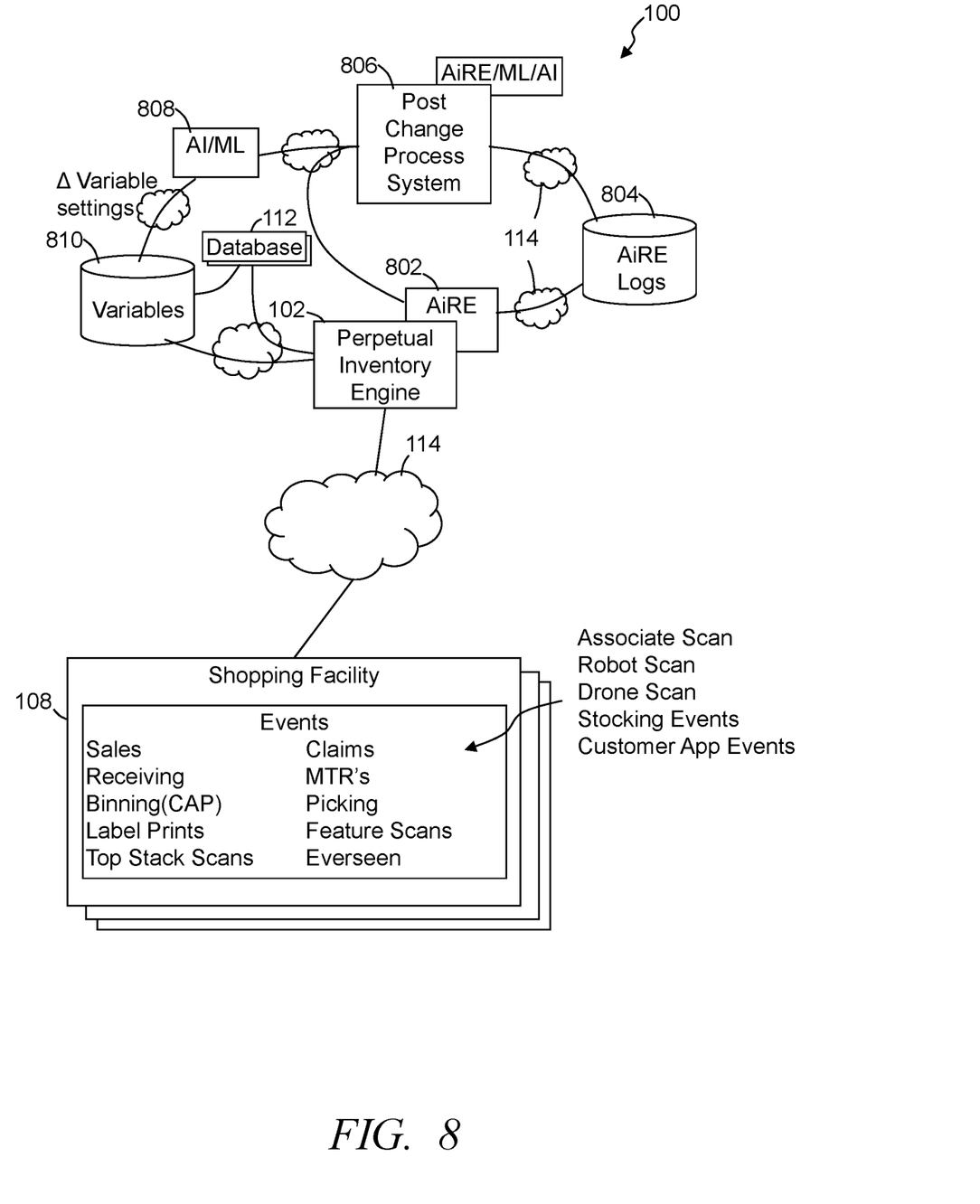
FIG. 8 illustrates a simplified block diagram of a retail perpetual inventory control system, in accordance with some embodiments.

FIG. 8 illustrates a simplified block diagram of a retail perpetual inventory control system 100, in accordance with some embodiments. The system includes a perpetual inventory engine 102 that utilizes a rules processing engine (AiRE) 802 and a post change processing system 806 providing a dynamic rules engine and dynamic rules that are tuned over time to improve results. Further, some embodiments include one or more dynamically adjusting systems 808, such as artificial intelligence (AI) and/or machine learning (ML) systems are configured to evaluate adjustments made to inventory and/or lack of adjustments based on the application of one or more inventory rules. In some implementations, the perpetual inventory engine and rules processing engine are implemented through a distributed system that is distributed over a computer network, and as such may be considered, in some applications, as a centralized cloud computing system. In some embodiments, for example, the rules processing engine may be implemented as part of the PI engine based on a business rules management system such as "drools" application.

The system receives event and/or inventory information from multiple retail stores 108, fulfillment centers and other such facilities. Event information and/or inventory information provided by the retail stores may include, but are not limited to, for example sales information (e.g., sales of one or more products at the store, on-line relative to the store, etc.), claims or other markdowns of one or more products (e.g., due to damage, recall, etc.), merchandise transfer requests (MTRs), binning (e.g., notification that a store associate places one or more products in a back storage area, which may occur in response to the store associate using a hand-held scanner or other such device), picking (e.g., store associate retrieves products from the back storage area for placement on the sales floor, which may be in response to a demand notification), label prints (e.g., which may be a printed label corresponding to product that was returned to the back storage because it could not be stocked on the sales floor), feature scans (e.g., product being placed in a featured location on the sales floor), top stack scans (e.g., corresponding to indications of overstock), theft detections (e.g., detection of someone at a self-checkout station appearing to scan a product when not actually scanning, RFID tag movement beyond a threshold without a detection of purchase, etc.), and/or other such events. Some of this data is based on inputs from store associates, customers, store systems, and/or other sources. For example, associates may use barcode scanners, RFID tag scanners, or the like; one or more automated, robot and/or drone systems may perform scans or other detections (e.g., RFID tag readers distributed at one or more locations in the store), stocking events, customer APPs events, and/or other such inputs.

The PI engine 102, which may include and/or be in cooperation with the rules processing engine 802, applies the one or more rules of one or more series or sets of inventory evaluation rules that are triggered in response to one or more of the events. Previous inventory systems apply a historic analytics or backward looking evaluation of inventory, which takes time to accumulate relevant data to be used in making the evaluation. Alternatively, some present embodiments are at least partially forward looking and/or predictive based on captured events in substantially real-time allowing substantially real time inventory evaluations, which allows substantially real-time reactions to current inventory issues. Further, the system 100 is configured to receive thousands of events a minute per store and in some instances tens of thousands of events may occur per minute per store. The PI engine 102, in some embodiments, is configured to apply filtering to the events to prioritize events and/or detect based on the application of filtering rules to detect indicators in the data to trigger that data to be flagged or duplicated for further processing of an accumulation of such data (e.g., within five-ten seconds, and often less) to enable the application of one or more further inventory rules to that accumulation of data to achieve a result within a threshold level of confidence to activate an inventory change at the retail store being evaluated. Again, the system 100 may operate to evaluate perpetual inventory at multiple different stores, providing for potentially hundreds of thousands of events per minute.

Some embodiments further include the artificial intelligence and/or machine learning system 808 to evaluate decisions over time and the effects of implemented inventory change decisions. Based on this evaluation, the post change processing system and/or machine learning system are configured to make adjustments to rules, thresholds, when rules are applied and/or other such modifications over time to improve over time the resulting inventory change instructions that are implemented. As such the machine learning system, in some embodiments, provides post inventory change evaluations to implement dynamic rules in tuning the rule sets, thresholds and/or the factors relative to application based on different events. Further, in some embodiments, the rule sets and/or thresholds are tuned for a particular retail store based on the post change processing.

In some embodiments, the PI engine 102 and/or rules processing engine 802 access memory and/or database 810 storing variables and values to variables to be used in applying the one or more rules. Example variables may include, but are not limited to, rate of sale, static sales period (e.g., period of time that a product did not sell), unit sold minimum during a time frame, number of out of stock scans, number of times a product could not be located to be stocked on the sales floor, number of times there was an out of stock scan when there is a positive on-hand quantity value, number of times there was an out of stock that was not scanned when there is a zero on hand, and other such rules. The PI engine and/or rules processing engine applies these variables in one or more rules to determine when to initiate inventory actions and/or changes. Some embodiments further maintain logs 804 of rule applications, variables applied and/or decisions based on the rules. The post change processing system 806 is configured to evaluate the log data following decisions to tune the variables and rules.

In some embodiments, systems and methods monitor and adjust PI. Some embodiments provide a PI control system, comprising: multiple point of sale (POS) systems; at least one inventory system communicatively coupled with at least a set of the multiple POS systems at a first shopping facility of multiple shopping facilities; a perpetual inventory (PI) engine control circuit communicatively coupled with the inventory system, and further receives inventory information from the inventory system and sales data recorded by the multiple POS systems; wherein the PI engine control circuit is configured to identify the occurrence of a plurality of different events each associated with a different product of thousands of different products at one of the multiple different shopping facilities, and each event corresponds to a potential inconsistency in a determined inventory count of the corresponding product; and for each of the events: identify, dependent on the event and a corresponding first product, a first set of inventory evaluation rules from multiple sets of inventory evaluation rules; apply the first set of inventory evaluation rules to determine a type of inventory count error relative to the determined inventory count of the first product at the first shopping facility; determine an inventory adjustment action to be implemented based on the first product and the determined error type; and cause the inventory adjustment action to be implemented in substantially real-time to adjust the determined inventory count of the first product at the first shopping facility.

In some embodiments, methods monitoring and adjusting perpetual inventory comprise: identifying the occurrence of a plurality of different events each associated with a different product of thousands of different products at one of multiple different shopping facilities, wherein each event corresponds to a potential inconsistency in a determined inventory count of the corresponding product; and for each of the events: identifying, dependent on the event and a corresponding first product, a first set of inventory evaluation rules from multiple sets of inventory evaluation rules; applying the first set of inventory evaluation rules to determine a type of inventory count error relative to the determined inventory count of the first product at the first shopping facility; determining an inventory adjustment action to be implemented based on the first product and the determined error type; and causing the inventory adjustment action to be implemented in substantially real-time to adjust the determined inventory count of the first product at the first shopping facility.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. A perpetual inventory (PI) control system, comprising:
   at least one inventory system communicatively coupled with multiple point-of-sale (POS) systems at a first retail facility of multiple retail facilities;
   a perpetual inventory (PI) engine control circuit communicatively coupled with the inventory system, and wherein the PI engine control circuit is configured to:
   access inventory information from the inventory system;
   identify an occurrence of a plurality of different events each associated with a different product available at the first retail facility, and each event corresponds to a potential inaccuracy in an inventory count of the corresponding product; and for each of the events: identify a type of inventory count error relative to a first product at the first retail facility; identify a first set of at least one inventory evaluation rules based on the type of inventory count error at the first retail facility, and apply the first set of at least one inventory evaluation rules to determine an inventory adjustment action to be implemented; and cause the inventory adjustment action to be implemented in substantially real-time to adjust the inventory count of the first product at the first retail facility; and
   push inventory adjustment information to multiple different inventory storage devices without a request from an external device.

2. The PI control system of claim 1, wherein the PI engine control circuit is further configured to:
   identify, dependent on the event, a second set of at least one inventory evaluation rules from multiple sets of inventory evaluation rules and apply the second set of at least one inventory evaluation rules to determine the type of inventory count error relative to the first product at the first retail facility.

3. The PI control system of claim 1, wherein the PI engine control circuit is further configured to:
   evaluate over time multiple different inventory adjustment actions implemented based on an application of the first set of at least one inventory evaluation rules applied in determining a respective one of the multiple different inventory adjustment actions that was implemented; and
   modify at least a first inventory evaluation rule of the first set of at least one inventory evaluation rules based on changes in sales resulting from the multiple different adjustment actions.

4. The PI control system of claim 1, wherein the PI engine control circuit in determining the inventory adjustment action selects the inventory adjustment action based on a previous inventory adjustment action implemented relative to the first product at the first retail facility.

5. The PI control system of claim 4, wherein the PI engine control circuit in causing the inventory adjustment action to be implemented maintains over time, during which multiple different ordered shipments of the first product are received at the first retail facility, actual inventory counts of the first product at the first retail facility within threshold margins of inventory errors defined by a difference between the actual inventory count of the first product at the first retail facility and determined inventory counts of the first product over time.

6. The PI control system of claim 1, wherein the PI engine control circuit is further configured to modify, relative to at least the first product and based on results from the PI engine control circuit applying the first set of at least one inventory evaluation rules, one or more inventory evaluation rules of a second set of inventory evaluation rules that were previously applied relative to the first product.

7. The PI control system of claim 1, wherein the PI engine control circuit is further configured to determine a second product is subject to the type of inventory count error determined to be relevant to the first product, and apply the first set of at least one inventory evaluation rules relative to the second product while applying at least one different parameter, than a parameter applied while applying the first set of at least one inventory evaluation rules relative to the first product, to identify a second inventory adjustment action to be implemented based on the second product.

8. The PI control system of claim 1, wherein the PI engine control circuit, in determining the inventory adjustment action to be implemented, is configured to determine the adjustment action to maintain the inventory count within boundaries of threshold margins of inventory errors corresponding to the first product while not attempting to determine an actual inventory count of the first product.

9. The PI control system of claim 1, wherein the PI engine control circuit, in pushing the inventory adjustment information to the multiple different inventory storage devices, is configured to push the inventory adjustment information without a request from the inventory storage devices, wherein each of the inventory storage devices is accessible by at least one of multiple remote processing systems providing the multiple remote processing systems with substantially real time access to the inventory adjustment information.

10. The PI control system of claim 1, wherein the PI engine control circuit, in pushing the inventory adjustment information to the multiple different inventory storage devices, is configured to push the inventory adjustment information without receiving a confirmation of transmission from the multiple inventory storage devices, wherein each of the inventory storage devices is accessible by at least one of multiple remote processing systems providing the multiple remote processing systems with substantially real time access to the inventory adjustment information.

11. A method of monitoring and adjusting perpetual inventory (PI), comprising:
identifying an occurrence of a plurality of different events each associated with a different product available at a first retail facility of multiple different retail facilities, wherein each event corresponds to a potential inaccuracy in an inventory count of the corresponding product; and
for each of the events:
identifying a type of inventory count error relative to a first product at the first retail facility;
identifying a first set of at least one inventory evaluation rules based on the type of inventory count error;
applying the first set of at least one inventory evaluation rules and determining an inventory adjustment action to be implemented; and
causing the inventory adjustment action to be implemented in substantially real-time to adjust the inventory count of the first product at the first retail facility; and
pushing inventory adjustment information to multiple different inventory storage devices without a request from an external device.

12. The method of claim 11, further comprising:
identifying, dependent on the event, a second set of at least one inventory evaluation rules from multiple sets of inventory evaluation rules and applying the second set of at least one inventory evaluation rules to determine the type of inventory count error relative the first product at the first retail facility.

13. The method of claim 11, further comprising:
evaluating over time multiple different inventory adjustment actions implemented based on an application of the first set of at least one inventory evaluation rules applied in determining a respective one of the multiple different inventory adjustment actions that was implemented, and relative to changes in sales resulting from the multiple different adjustment actions; and
modifying at a first inventory evaluation rule of the first set of at least one inventory evaluation rules based on changes in sales resulting from the multiple different adjustment actions.

14. The method of claim 11, wherein the determining the inventory adjustment action comprises selecting the inventory adjustment action based on a previous inventory adjustment action implemented relative to the first product at the first retail facility.

15. The method of claim 14, wherein the causing the inventory adjustment action to be implemented comprises:
maintaining over time, during which multiple different ordered shipments of the first product are received at the first retail facility, actual inventory counts of the first product at the first retail facility within threshold margins of inventory errors defined by a difference between the actual inventory count of the first product at the first retail facility and determined inventory counts of the first product over time.

16. The method of claim 11, further comprising:
modifying, relative to at least the first product and based on results of applying the first set of at least one inventory evaluation rules, one or more inventory evaluation rules of a second set of inventory evaluation rules that were previously applied relative to the first product.

17. The method of claim 11, further comprising:
determining a second product is subject to the type of inventory count error determined to be relevant to the first product;
applying the first set of at least one inventory evaluation rules relative to the second product while applying at least one different parameter, than a parameter applied while applying the first set of at least one inventory evaluation rules relative to the first product; and
identifying a second inventory adjustment action to be implemented based on the second product.

18. The method of claim 11, wherein the determining the inventory adjustment action to be implemented further comprises determining the adjustment action to maintain the inventory count within boundaries of threshold margins of inventory errors corresponding to the first product while not attempting to determine an actual inventory count of the first product.

19. The method of claim 11, wherein the pushing the inventory adjustment information to the multiple different inventory storage devices comprises pushing the inventory adjustment information without a request from the inventory storage devices, wherein each of the inventory storage devices is accessible by at least one of multiple remote processing systems providing the multiple remote processing systems with substantially real time access to the inventory adjustment information.

20. The method of claim 11, wherein the pushing the inventory adjustment information to the multiple different inventory storage devices comprises pushing the inventory adjustment information without receiving a confirmation of transmission from the multiple inventory storage devices, wherein each of the inventory storage devices is accessible by at least one of multiple remote processing systems providing the multiple remote processing systems with substantially real time access to the inventory adjustment information.

* * * * *

UNITED STATES PATENT AND TRADEMARK OFFICE
CERTIFICATE OF CORRECTION

PATENT NO. : 11,645,639 B2
APPLICATION NO. : 17/349196
DATED : May 9, 2023
INVENTOR(S) : Cristy C. Brooks et al.

Page 1 of 1

It is certified that error appears in the above-identified patent and that said Letters Patent is hereby corrected as shown below:

In the Claims

In Column 21, Claim 12, Line 29, delete "relative the" and replace with --relative to the--.

Signed and Sealed this
Twenty-fourth Day of October, 2023

Katherine Kelly Vidal
*Director of the United States Patent and Trademark Office*